(12) United States Patent
Gelwicks et al.

(10) Patent No.: US 11,720,236 B1
(45) Date of Patent: Aug. 8, 2023

(54) DISPLAYING REPORTS IN A CONTENT MANAGEMENT SYSTEM

(71) Applicant: Veeva Systems Inc., Pleasanton, CA (US)

(72) Inventors: Graham Gelwicks, San Francisco, CA (US); Peter Gassner, Pleasanton, CA (US); Jon Stone, Manteca, CA (US); Shu-Shang Sam Wei, Danville, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 16/261,438

(22) Filed: Jan. 29, 2019

(51) Int. Cl.
*G06F 3/0484* (2022.01)
*G06T 11/20* (2006.01)

(52) U.S. Cl.
CPC ............ *G06F 3/0484* (2013.01); *G06T 11/206* (2013.01); *G06T 2200/24* (2013.01)

(58) Field of Classification Search
CPC ... G06F 3/0484; G06T 11/206; G06T 2200/24
See application file for complete search history.

(56) References Cited

U.S. PATENT DOCUMENTS

| | | | | |
|---|---|---|---|---|
| 7,640,496 | B1* | 12/2009 | Chaulk et al. | H04L 67/1097 715/204 |
| 9,424,333 | B1* | 8/2016 | Bisignani et al. | G06F 3/0482 |
| 9,633,076 | B1* | 4/2017 | Morton et al. | G06F 16/248 |
| 2003/0055830 | A1* | 3/2003 | Gutierrez-Rivas et al. | G06F 16/2423 |
| 2003/0163461 | A1* | 8/2003 | Gudbjartsson et al. | G06F 16/284 |
| 2006/0041539 | A1* | 2/2006 | Matchett et al. | G06Q 10/0639 |
| 2009/0070365 | A1* | 3/2009 | Pallari et al. | G06F 16/84 |
| 2016/0125049 | A1* | 5/2016 | Stone et al. | G06F 16/248 707/741 |
| 2018/0152457 | A1* | 5/2018 | Abson | H04L 63/062 |
| 2019/0362006 | A1* | 11/2019 | Ziauddin | G06F 16/2456 |

* cited by examiner

*Primary Examiner* — Jennifer N Welch
*Assistant Examiner* — Parmanand D Patel

(57) ABSTRACT

Systems and methods for generating a multi-view report in a content management system. A number of report views may be defined and a report type may be configured. The report type configuration may define the report views to be included, the field the report views match on, and how the report views should be joined. The multi-view report is generated according to the report type configuration.

18 Claims, 23 Drawing Sheets

| | | | | | | | |
|---|---|---|---|---|---|---|---|
| JOIN ON MONTH (FORMULA ON DATE) | | | | | | | |
| CREATED DATE | QUALITY EVENT COUNT | | CREATED DATE | CAPA COUNT | | CREATED DATE | QUALITY EVENT COUNT | CAPA COUNT |
| JANUARY 2017 | 2 | | JANUARY 2017 | 1 | | JANUARY 2017 | 2 | 1 |
| FEBRUARY 2017 | 4 | + | FEBRUARY 2017 | 8 | = | FEBRUARY 2017 | 4 | 8 |
| MARCH 2017 | 7 | | MARCH 2017 | 3 | | MARCH 2017 | 7 | 3 |
| APRIL 2017 | 3 | | APRIL 2017 | 3 | | APRIL 2017 | 3 | 3 |
| MAY 2017 | 4 | | MAY 2017 | 12 | | MAY 2017 | 4 | 12 |
| JUNE 2017 | 10 | | JUNE 2017 | 6 | | JUNE 2017 | 10 | 6 |

Business Admin  Logs  Users & Groups Configuration  Operations  Deployment  Settings     VAULT

DOCUMENT SETUP
Document Types
Document Fields
Field Dependencies
Field Layout
Rendition Types
Document Tags

OBJECT SETUP
Objects

REPORT SETUP
Report Views
Report Types

WORKFLOW SETUP
Document Lifecycles
Object Lifecycles
Object Workflows
Lifecycle State Colors
Custom Actions

EMAIL & NOTIFICATIONS

All Report Views

⊕ Create 1-3 of 3

| Name | Report Type 601 | Description ▼ | Tags | Created By |
|---|---|---|---|---|
| Product with Document View | Product with Document | | | Graham Gelwicks |
| Documents Grouped by Month View | Document | | | Graham Gelwicks |
| Documents Grouped by Created By | Document | | | Graham Gelwicks |

|  | TEXT | NUMBER | DATE | DATE TIME | YES/NO | PICKLIST | OBJECT |
|---|---|---|---|---|---|---|---|
| TEXT | YES, DEPENDING ON SIZE | | | | | | ONLY IF TEXT IS OBJECT ID |
| NUMBER | | YES, USE CASE COULD BE VERSION | | | | | |
| DATE | | | YES, ALSO WHEN GROUPED | ONLY WHEN BOTH ARE GROUPED | | | |
| DATE TIME | | | ONLY WHEN BOTH ARE GROUPED | ONLY WHEN BOTH ARE GROUPED | | | |
| YES/NO | | | | | | | |
| PICKLIST | | | | | | YES, MUST BE SAME PICKLIST | |
| OBJECT | ONLY IF TEXT IS OBJECT ID | | | | | | YES, MUST BE SAME OBJECT |

Report Types

| Report Type | Description | Class | Type | Status |
|---|---|---|---|---|
| Application with 3 up objects | Application with Procedure Type and Region and Indication | Base | Custom | Active |
| Binder Section with Document | | Base | Standard | Active |
| Binder Section with Document a... | | Base | Standard | Active |
| Binder with Document | | Base | Standard | Active |
| Impacted Documents Report | Registrations and related documents | Multi-Pass | Custom | Active |
| Regulatory Objective with Regist... | Regulatory Objective with Registration | Base | Custom | Active |

FIG. 17

« Back to reports
Create Report

Report Type*

Cancel   Continue

Name

Description

☐ Enable filter and column aliases

Expand all   Collapse all

▼ DOCUMENT
    ▦ Document
▲ DOCUMENT RELATIONSHIP
▲ WORKFLOW
▲ ACTIVITY
▲ APPLICATION
▲ BINDER
▲ CONTENT ITEM
▲ ORGANIZATION
▲ PRODUCT
▼ REGISTRATION
    ▦ Registration
    ▦ Impacted Documents Report
    ▦ Registration with Regulatory Objective
▲ REGULATORY OBJECTIVE
▲ SUBMISSION

FIG. 18

« Back to reports
Untitled Report ✏️ ☆

Report Type Impacted Documents Report

▲ CONDITIONAL FIELDS

▶ FILTERS (optional)

[ SelectField ▶ ]

Add filter alias

▶ PROMPTS (optional)

Cancel　Run　Save

| Registration with Regulatory Objective | Registration > Name ◀ ✏️ | Regulatory Objective with Submission<br>Submission > Name ✏️ | Content Item with Content Plan and Document<br>Document > Name ✏️ |
|---|---|---|---|
| Group rows by [ SelectField ▶ ] ⊗ | | | |
| Add field to group by (optional) | | | |

Edit Columns

JOIN ON MONTH (FORMULA ON DATE)

| CREATED DATE | QUALITY EVENT COUNT |
|---|---|
| JANUARY 2017 | 2 |
| FEBRUARY 2017 | 4 |
| MARCH 2017 | 7 |
| APRIL 2017 | 3 |
| MAY 2017 | 4 |
| JUNE 2017 | 10 |

+

| CREATED DATE | CAPA COUNT |
|---|---|
| JANUARY 2017 | 1 |
| FEBRUARY 2017 | 8 |
| MARCH 2017 | 3 |
| APRIL 2017 | 3 |
| MAY 2017 | 12 |
| JUNE 2017 | 6 |

=

| CREATED DATE | QUALITY EVENT COUNT | CAPA COUNT |
|---|---|---|
| JANUARY 2017 | 2 | 1 |
| FEBRUARY 2017 | 4 | 8 |
| MARCH 2017 | 7 | 3 |
| APRIL 2017 | 3 | 3 |
| MAY 2017 | 4 | 12 |
| JUNE 2017 | 10 | 6 |

FIG. 22

DISPLAYING REPORTS IN A CONTENT MANAGEMENT SYSTEM

BACKGROUND

The subject technology relates generally to content management, and more particularly to displaying reports in enterprise content management.

Users increasingly depend on content management systems because of their ubiquitous and managed access, from anywhere, at any time, from any device. However, because of the large volume of documents in content management systems and large number of users, organizing and displaying reports to help users to better understand the content has been a constant challenge.

SUMMARY

The disclosed subject matter relates to a method for generating a report in a content management system. The method comprises: displaying a first report view creation user interface for defining a first report view, wherein the first report view creation user interface comprises a first report type, and wherein the first report type stores information about a first table for a first report view, a second table for a second report view, and how they are joined together. The method also comprises: in response to an input on the first report view creation user interface, displaying a first report view definition user interface for defining the first report view, wherein the first report view definition user interface comprises information about how to group rows of the first report view. The method further comprises: generating a preview of the first report view in response to a request; saving the definition of the first report view; and displaying a first report type configuration user interface, wherein the first report type configuration user interface comprises the first report view and a description of the first report type.

BRIEF DESCRIPTION OF THE DRAWINGS

FIGS. 6 to 17 illustrate example user interfaces for configuring a multi-view report according to one embodiment of the present invention.

FIGS. 18 to 20 illustrate example user interfaces for generating a multi-view report according to one embodiment of the present invention.

FIG. 22 illustrates an example multi-view report according to one embodiment of the present invention.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
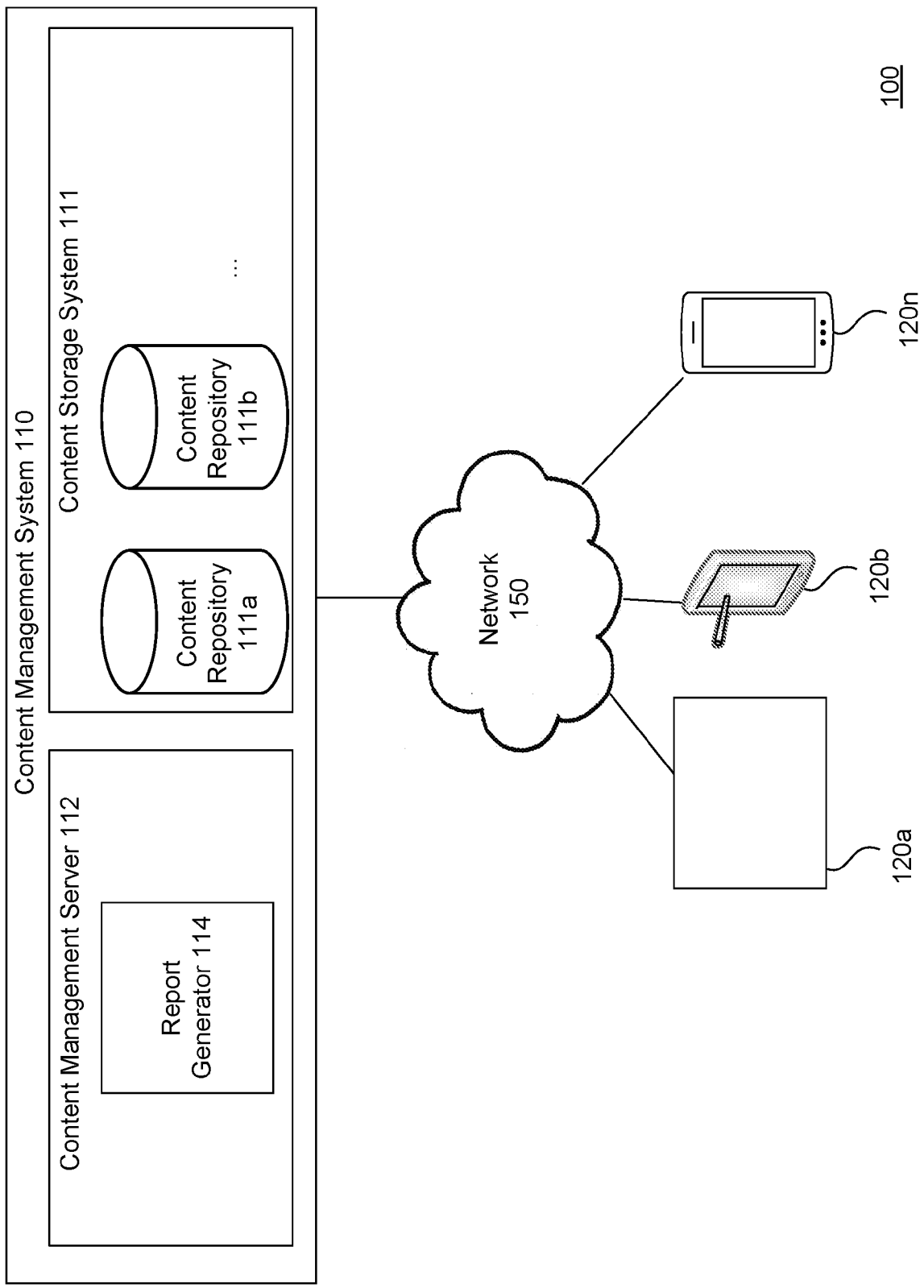
FIG. 1 illustrates an example high level block diagram of an enterprise content management architecture wherein the present invention may be implemented.

FIG. 1 illustrates an example high level block diagram of an enterprise content management architecture 100 wherein the present invention may be implemented. The enterprise may be a business, or an organization. As shown, the architecture 100 may include a content management system 110, and a plurality of user computing devices 120*a*, 120*b*, ... 120*n*, coupled to each other via a network 150. The content management system 110 may include a content storage system 111 and a content management server 112. The content storage system 111 may have one or more content repositories, e.g., 111*a* and 111*b*. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120*a*-120*n* may be any machine or system that is used by a user to access the content management system 110 via the network 150, and may be any commercially available computing devices including laptop computers, desktop computers, mobile phones, smart phones, tablet computers, netbooks, and personal digital assistants (PDAs).

The content storage system 111 may store content that user computing devices 120*a*-120*n* may access. Each content repository (e.g., 111*a* or 111*b*) may store a specific category of content, and allow users to interact with its content in a specific business context.

The content management server 112 is typically a remote computer system accessible over a remote or local network, such as the network 150. In one implementation, the content management server 112 may have a report generator 114 which may control the process for setting up user roles, generating user groups, matching user groups and documents, stamping user groups on matching documents, and enabling state or role based field level overrides, as will be described in detail below.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
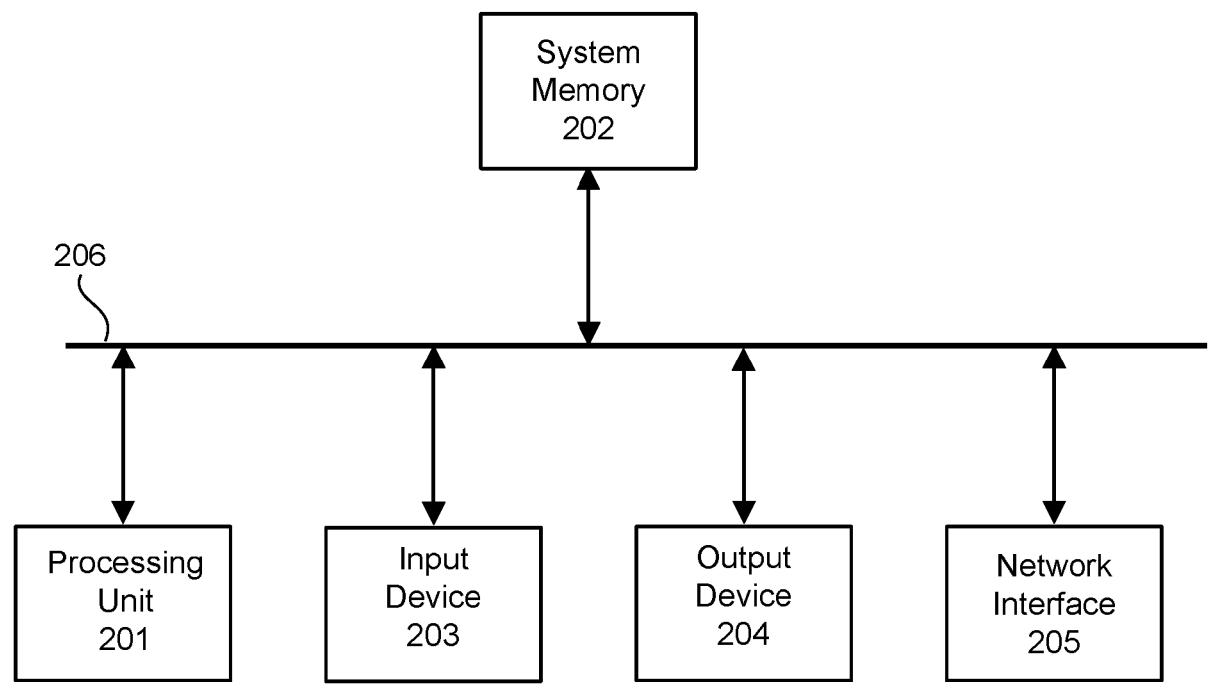
FIG. 2 illustrates an example high level block diagram of a computing device.

FIG. 2 illustrates an example block diagram of a computing device 200 which can be used as the user computing devices 120a-120n, and the content management server 112 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 304 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or or buses. The network interface 205 may be configured to allow the computing device 200 to transmit and receive data in a network, for example, the network 150. The network interface 205 may include one or more network interface cards (NICs).

Figure 3:
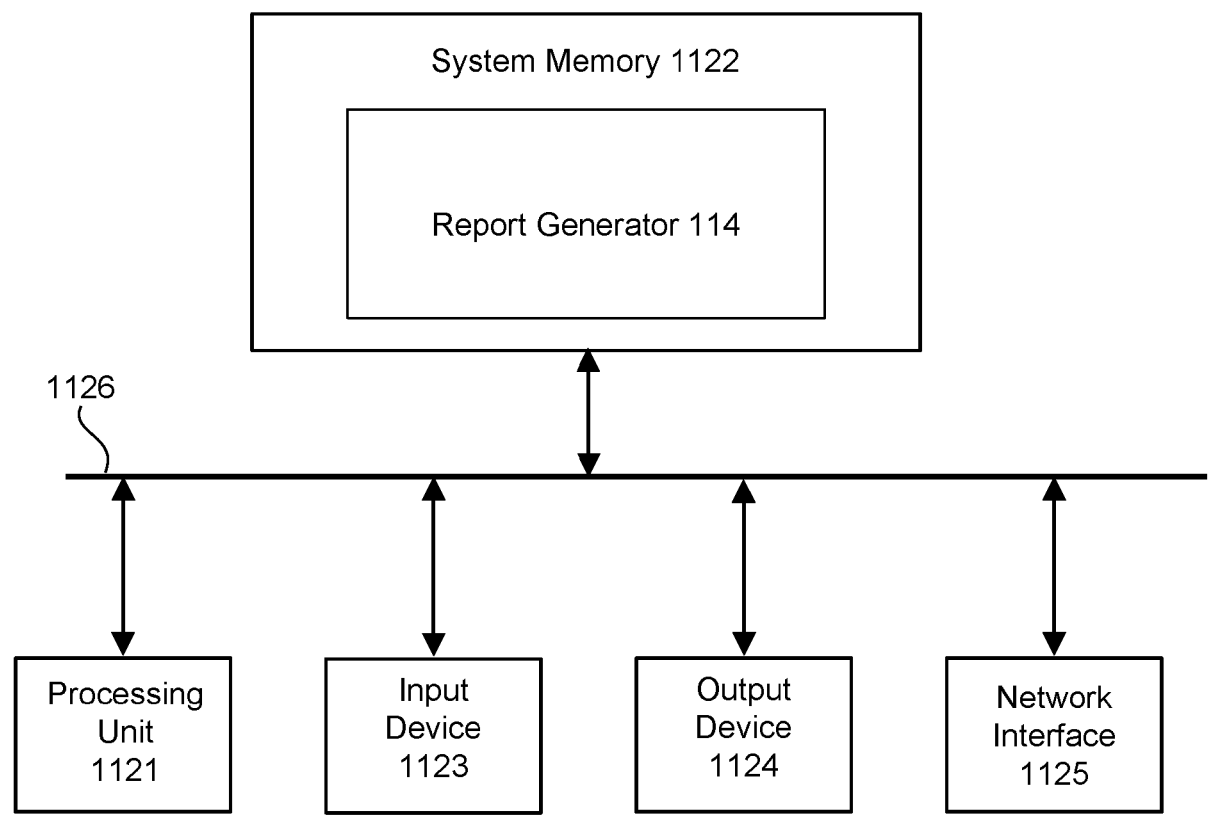
FIG. 3 illustrates an example high level block diagram of the content management server according to one embodiment of the present invention.

FIG. 3 illustrates an example high level block diagram of the content management server 112 according to one embodiment of the present invention. The content management server 112 may be implemented by the computing device 200, and may have a processing unit 1121, a system memory 1122, an input device 1123, an output device 1124, and a network interface 1125, coupled to each other via a system bus 1126. The report generator 114 may be stored in the system memory 1122, and control the process for configuring a multi-view report as described with reference to FIGS. 5A and 6 to 17, and the process for generating a multi-view report as described with reference to FIGS. 5B and 18-22.

The present invention allows users to build new reports by joining several reports into one. Customers are able to construct reports that span further into a data model, filter on aggregate or conditional fields, and combine indirectly related objects.

Figure 4:
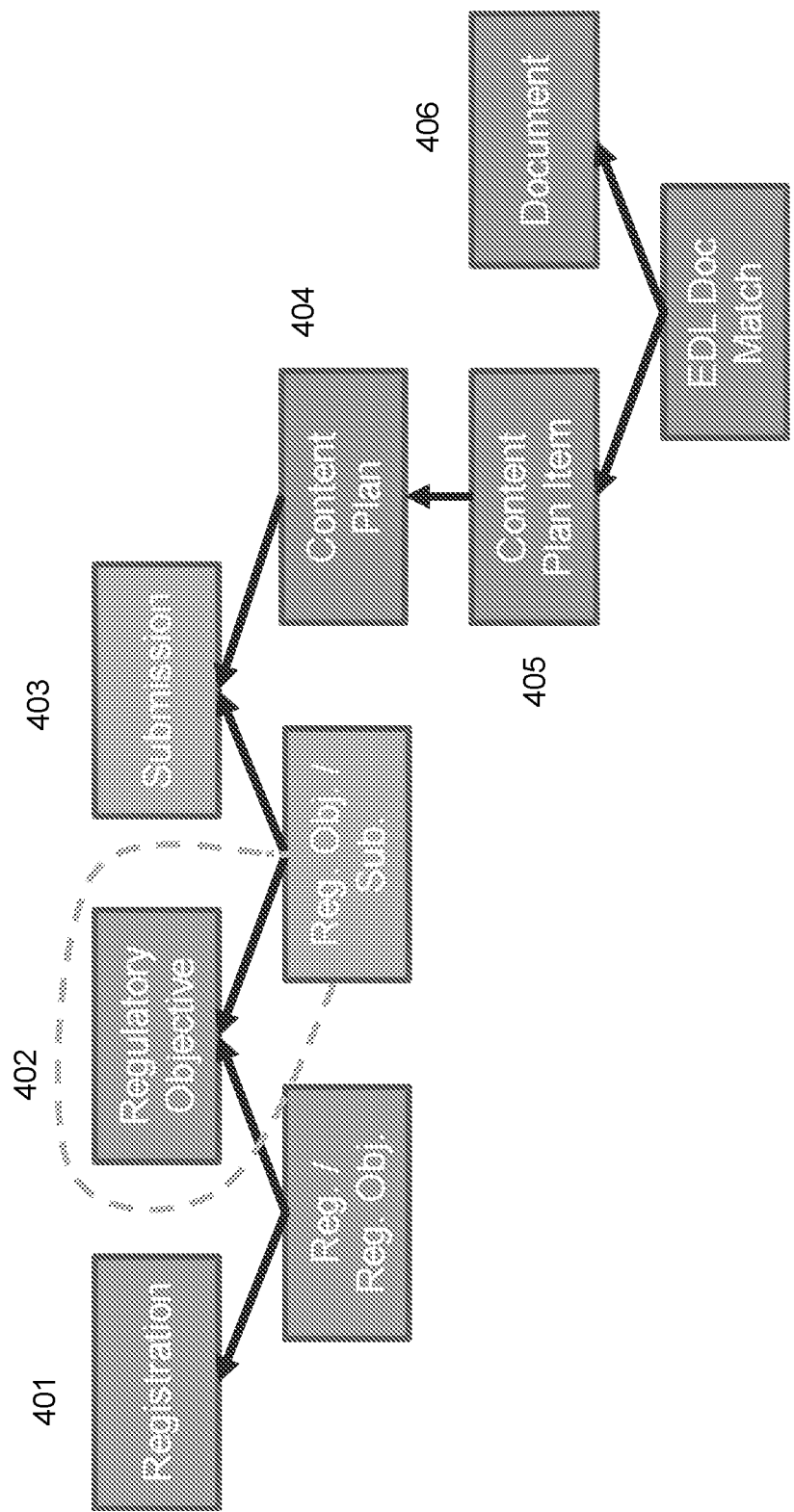
FIG. 4 illustrates an example of related documents impacted by a registration in a regulatory information management ("RIM") system according to one embodiment of the present invention.

In one example, a regulatory information management (RIM) system is used by pharmaceutical companies, or RIM customers, to submit product registrations to health authorities and update the product registrations. When changes impact a certain registration (e.g., 401), RIM customers need to find all of the related documents, including regulatory objective 402, submission 403, content plan 404, content plan item 405 and document 406 shown in FIG. 4. The present invention may allow RIM customers to build a report that includes registrations, their related documents and objects that lie therebetween, as described with reference to FIGS. 5A to 22 below.

In another example, an electronic data capture ("EDC") system is used by pharmaceutical companies, or EDC customers, to collect and manage clinical trial data. The present invention may enable EDC customers to construct a report with site and the associated subject, event, query, item and status counts.

Figure 5A:
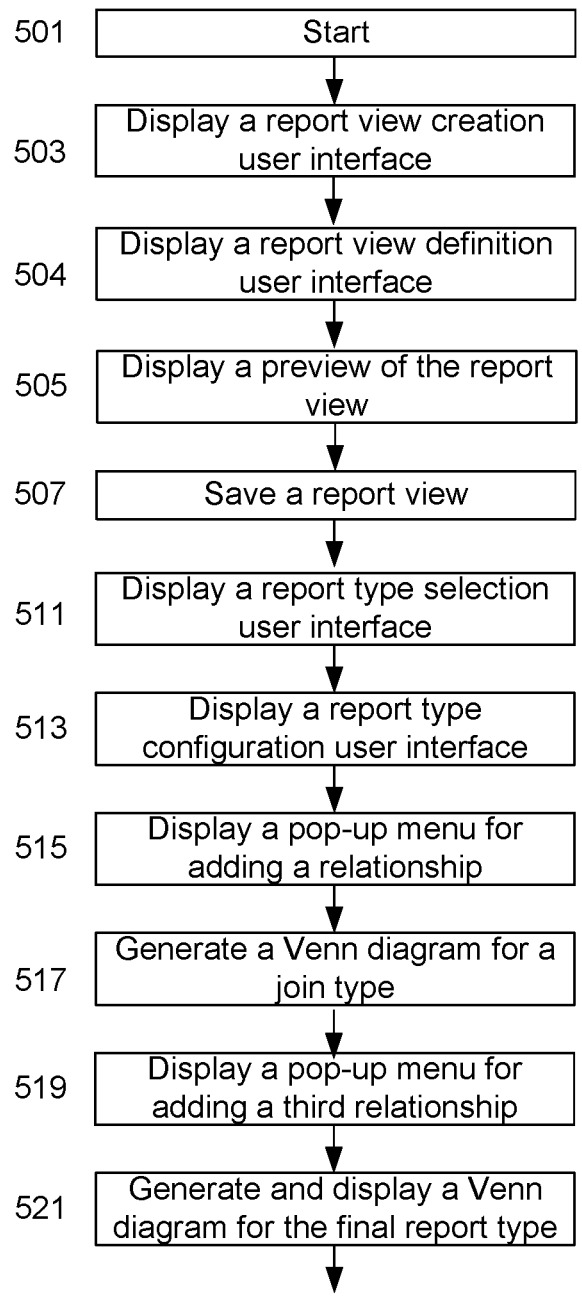
FIGS. 5A and 5B illustrate an example flowchart of a method for configuring and generating a multi-view report in a content management system according to one embodiment of the present invention.

FIG. 5A illustrates an example flowchart of a method for configuring a multi-view report type in a content management system according to one embodiment of the present invention. The process may start at 501.

At 503, a report view creation user interface may be displayed for a customer administrator to start to create a report view. An example of the report view creation user interface 600 is shown in FIG. 6. The report view may be a report created specifically for constructing larger reports, and may contain a list of columns, and a reference to a single report type 601. The report type is an entity that stores relationships between objects and views, and may store available tables and information about how they are joined together. Every report is based on a single report type.

Figure 7:
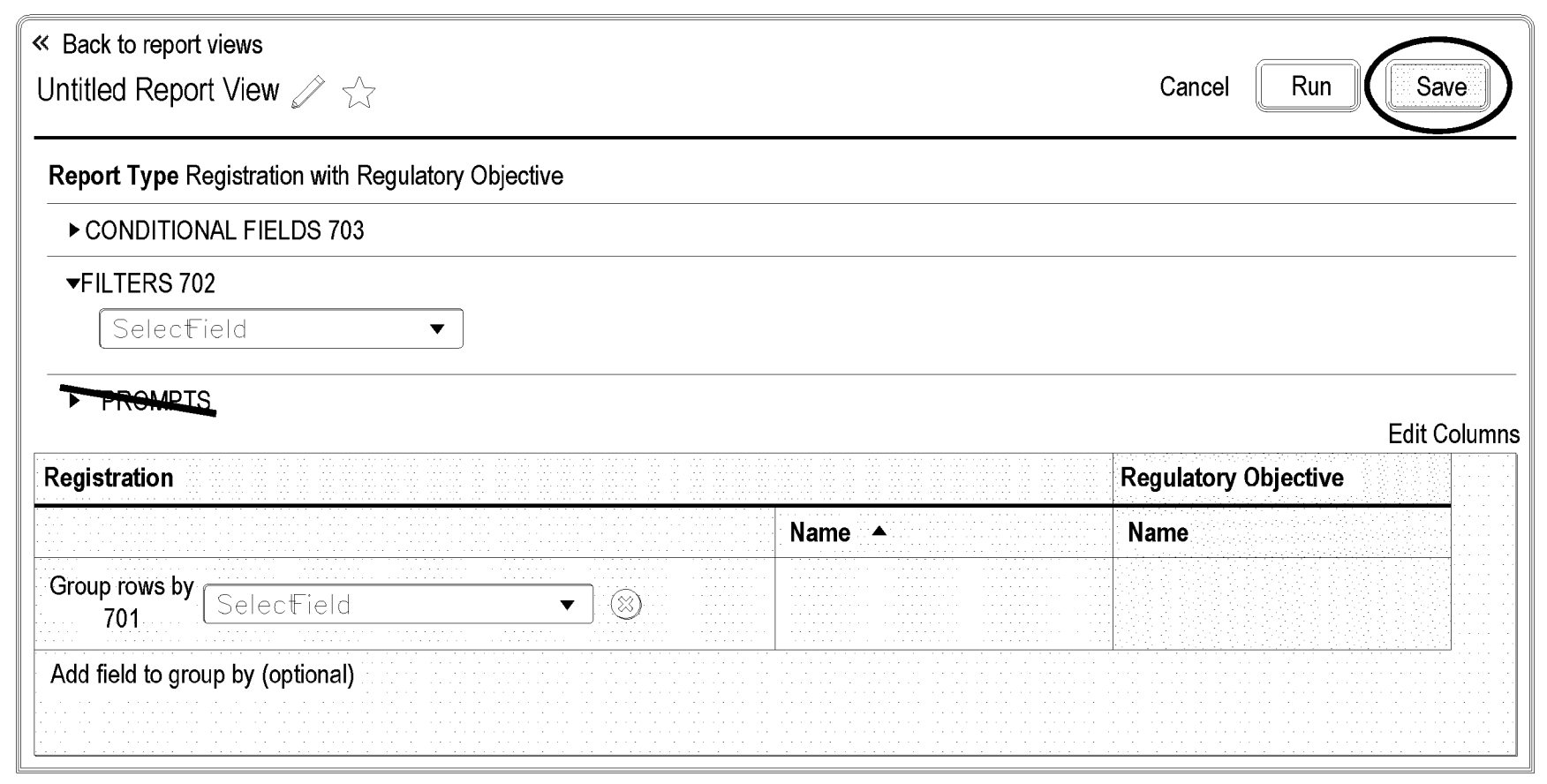

If the customer administrator clicks on the Create button 601 on the user interface 600, a report view definition user interface may be displayed at 504 for the customer administrator to define a report view. An example of the report view definition user interface is shown in FIG. 7. As shown, the report view definition user interface may have groupings 701, filters 702 (e.g., Registration equals "US - Cholecap Soft Cap" or Created Date > "Jan. 1, 2018") and conditional fields 703. Report views may be joined with objects and other views inside of a report type. The output of a report view may be a set of tuples.

Figure 8:
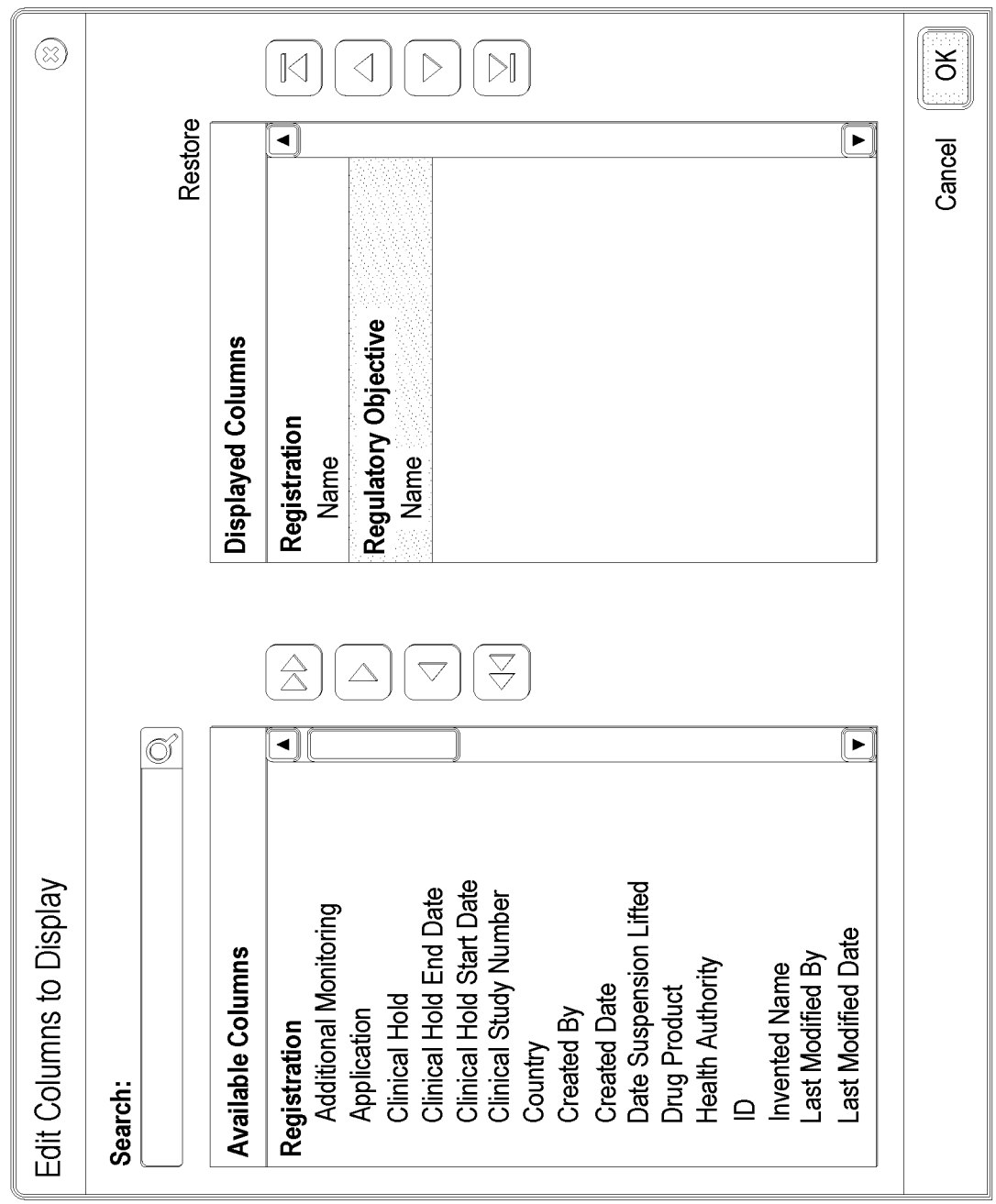

FIG. 8 shows examples of columns which may be selected by the customer administrator to be displayed in the final report.

Figure 9:
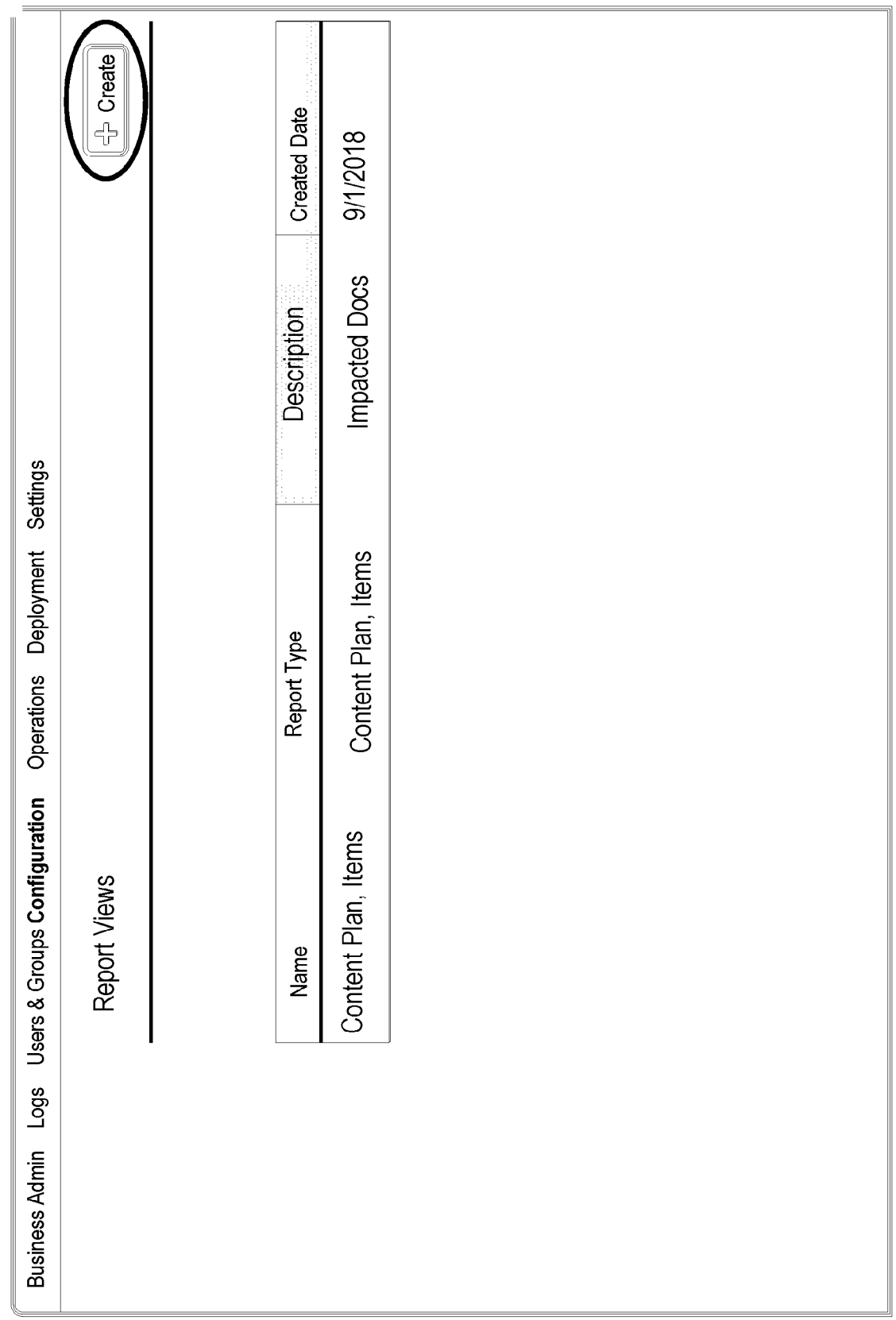

At 505, a preview of a report view may be displayed in response to a request from the customer administrator, so that he/she can review what the data looks like. FIG. 9 illustrates an example preview of a report view according to one embodiment of the present invention.

At 507, the report view defined by the customer administration may be saved.

Figure 10:

A new report type may be created and configured by the customer administrator. At 511, a list of report types may be displayed, as shown in FIG. 10. In one example, the report types may include "Standard" for a standard report and "Custom" to customize a report.

Figure 11:
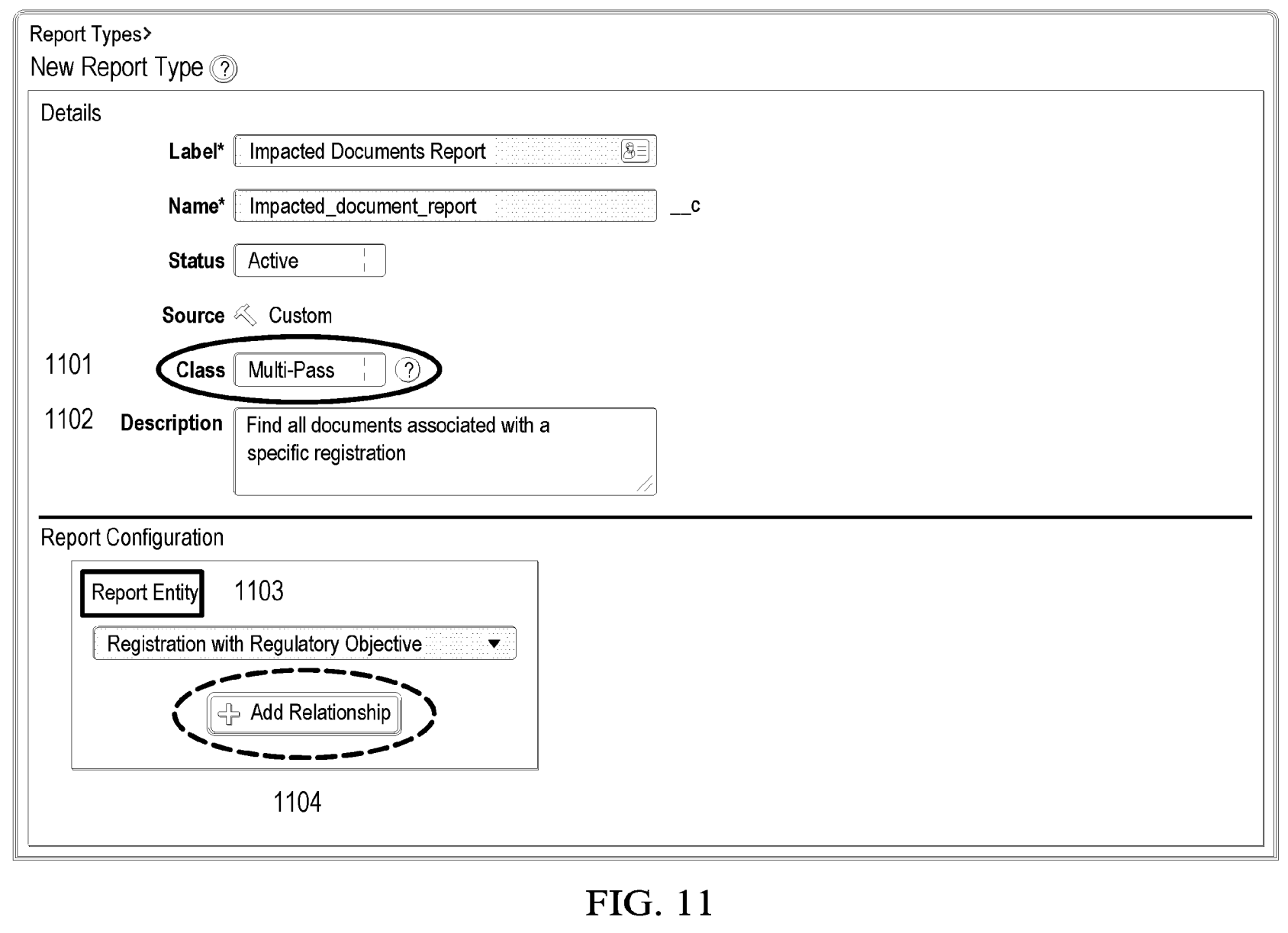

If the customer administrator selects to create a custom report type, a user interface may be displayed at 513 for him/her to configure the new report type. An example of the report type configuration user interface is shown in FIG. 11. As shown, the customer administrator may select Multi-view, or Multi-pass, as the Class 1101 of the report type, and define the Description of the report type 1102 as "Find all documents associated with a specific registration", and select "Registration with Regulatory Objective" as the Report Entity 1103.

Figure 12:
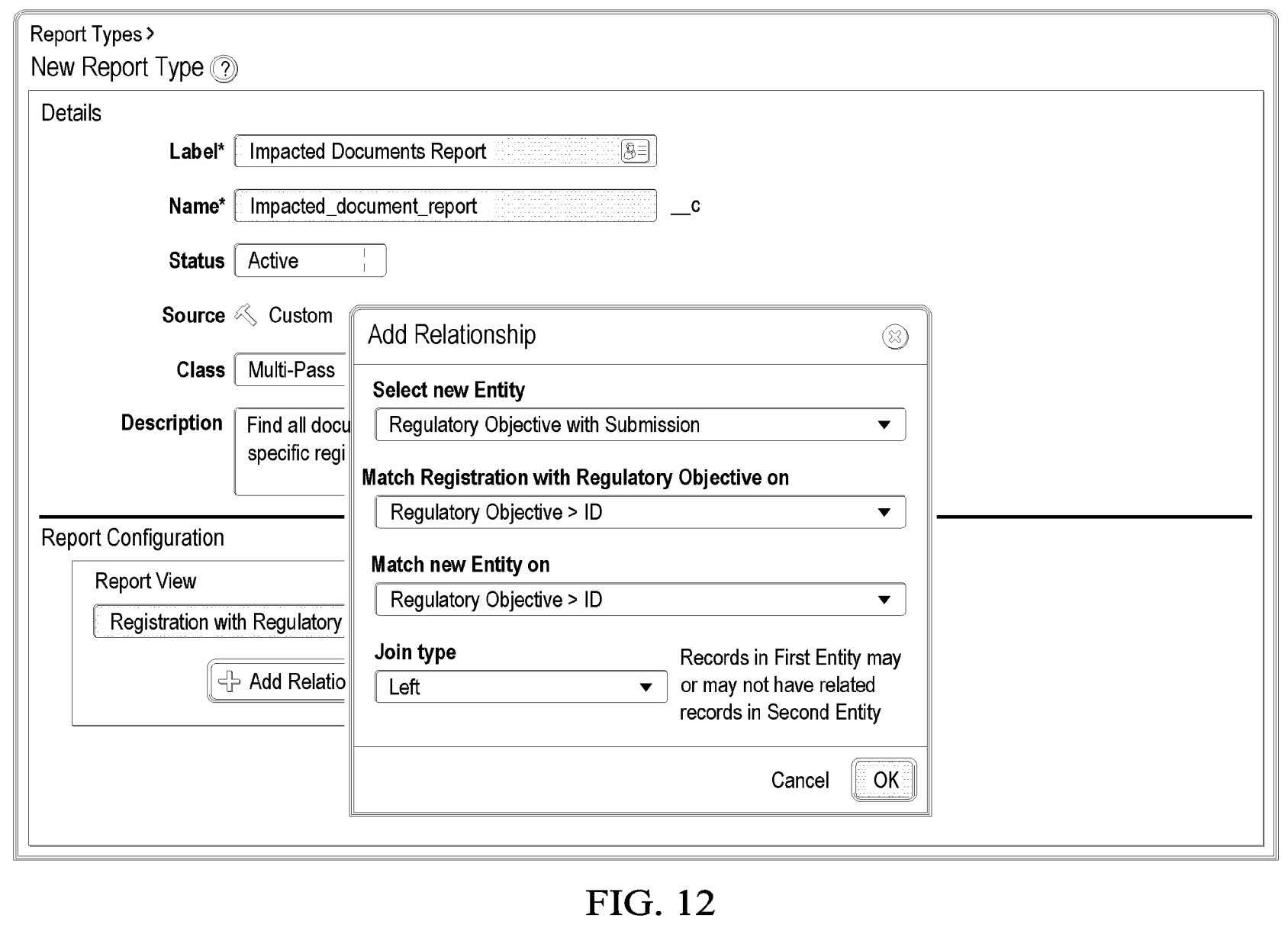

When the customer administrator clicks on the Add Relationship button 1104, a pop-up menu may be displayed at 515 for him/her to add a relationship, as shown in FIG. 12. The pop-up menu may have a number of windows for the customer administrator to add the relationship. An input may be received from the customer administrator to add a second report entity Regulatory Objective with Submission. An input may be received from the customer administrator to select a field to match on for both Entities. In the example shown, the Registration with Regulatory Objective is matched on Regulatory Objective > ID, and the new entity, Regulatory Objective with Submission, is also matched on Regulatory Objective > ID. Another input may be received from the customer administrator to define the join type, left, inner, or anti-join. Left join is when records in the first entity may or may not have related records in the second entity. In this case all records from the first entity are always returned, and the related records in the second entity are returned. Inner join is when the only records that have relationships across the first and second entities are returned. Records from the first view must have a related record to be returned in the results. Anti-join is when only the records in the first entity that do not have related records in the second entity are returned. Records in the second are never returned. Validation may occur when the customer administrator selects OK.

FIG. 13 illustrates an example of matching field support according to one embodiment of the present invention. As shown, text, number, date, date time, picklist and object in one entity may be matched to another entity.

Figure 14:
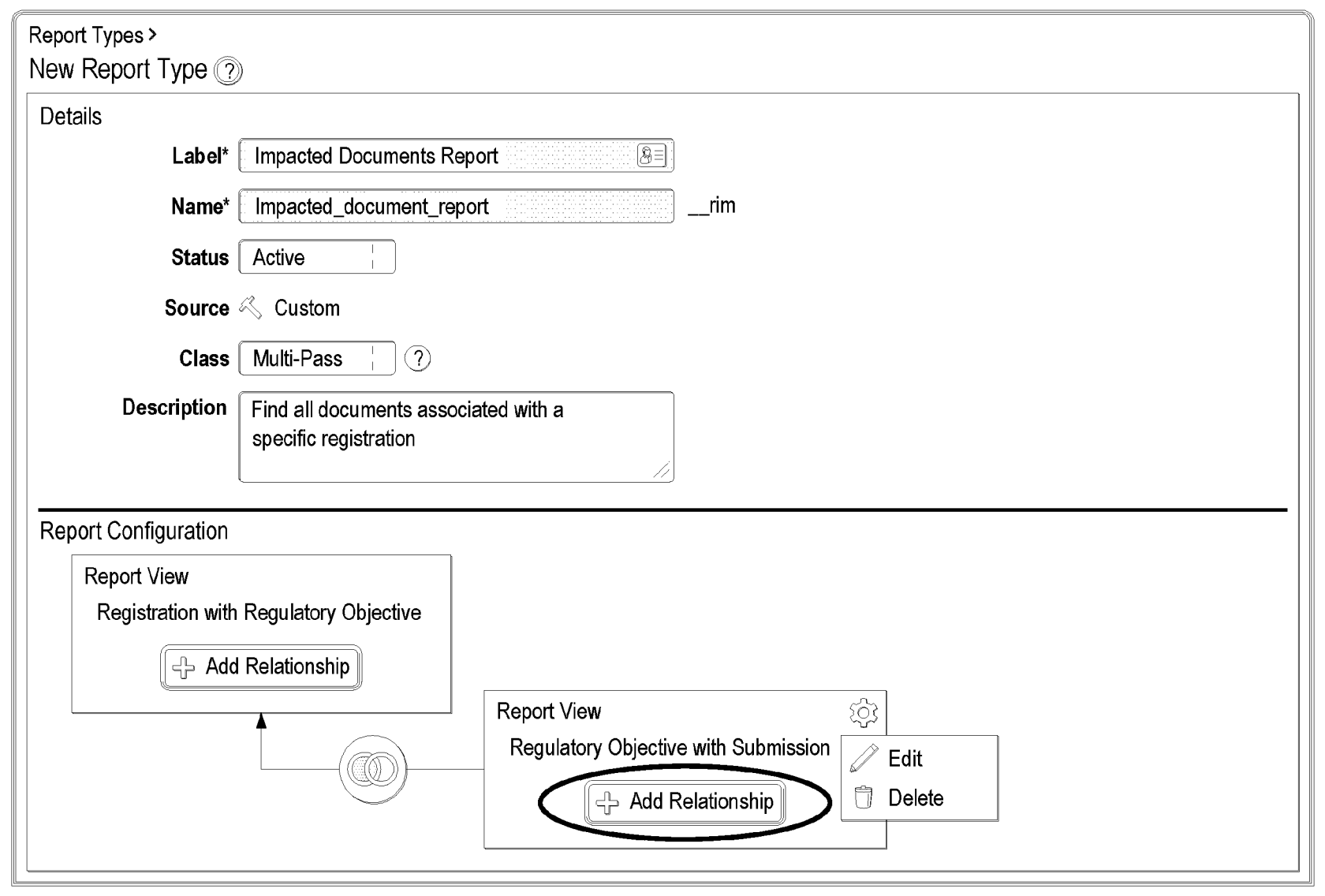

At 517, a Venn diagram may be generated and displayed to indicate join type. An example of the Venn diagram is shown in FIG. 14. As shown, the Venn diagram has two report views for the two entities the customer administrator selected, Registration with Regulatory Objective, and Regulatory Objective with Submission. The Venn diagram also indicates that it is a Left join, as the customer administrator defined. The customer administrator may add additional views to either of the existing views. Joined entities must follow one of two defined patterns: all report views must be joined in a chain (i.e., report view 2 is joined to report view 1, and report view 3 is joined to report view 2), or all report views must be joined to the report view 1 as a ladder.

Figure 15:
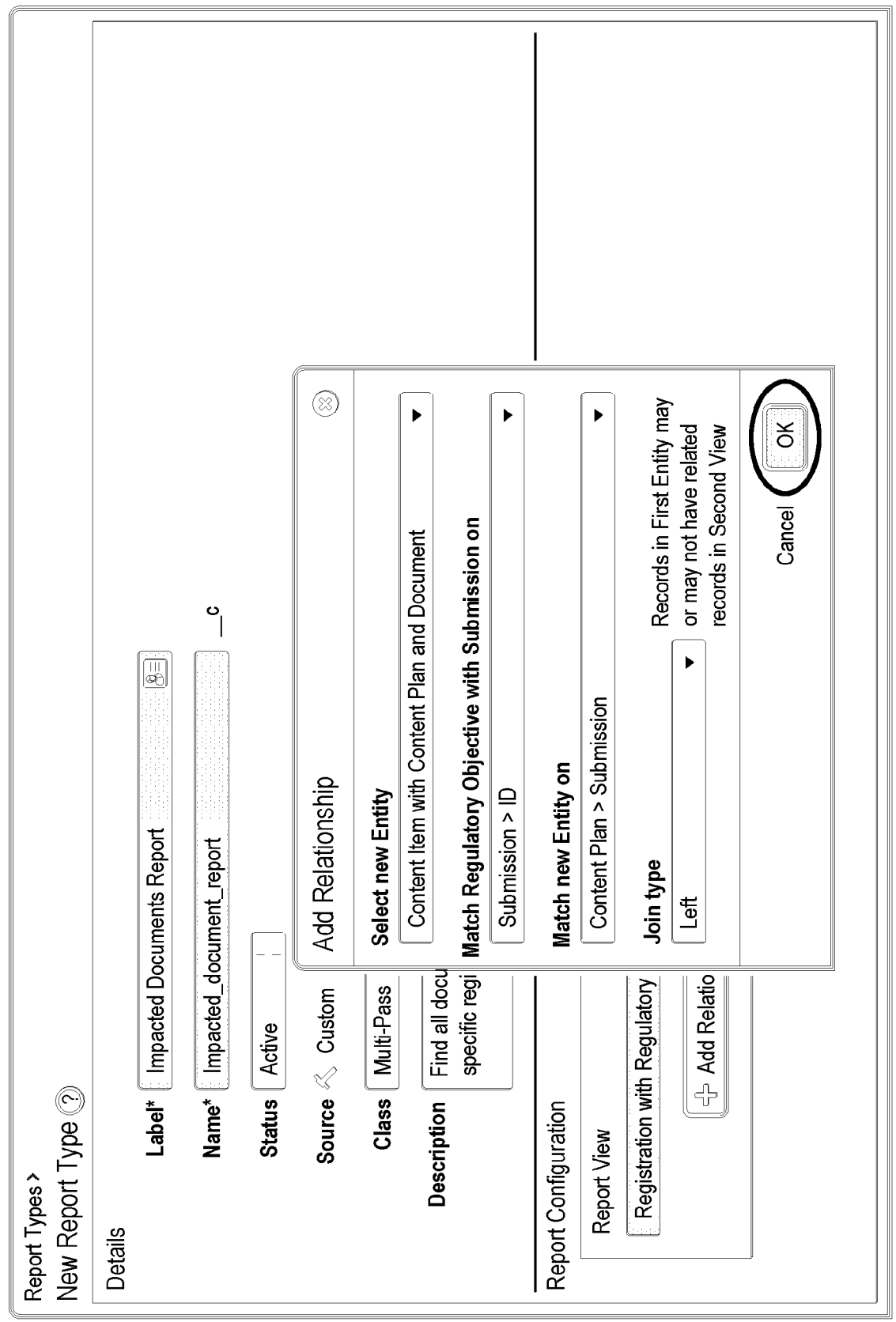

At 519, a third entity may be added. When the customer administrator clicks on the Add Relationship button 1104 on the user interface 1100, a pop-up menu may be displayed at for him/her to add a relationship, as shown in FIG. 15. An input may be received from the customer administrator to add a third entity Content Item with Content Plan and Document. An input may be received from the customer administrator to select the field to match the entity Regulatory Objective with Submission on Submission >ID, and to match the new entity on Content Plan > Submission. Another input may be received from the customer administrator to define the join type as left join. Validation may occur when the customer administrator selects OK.

Figure 16:
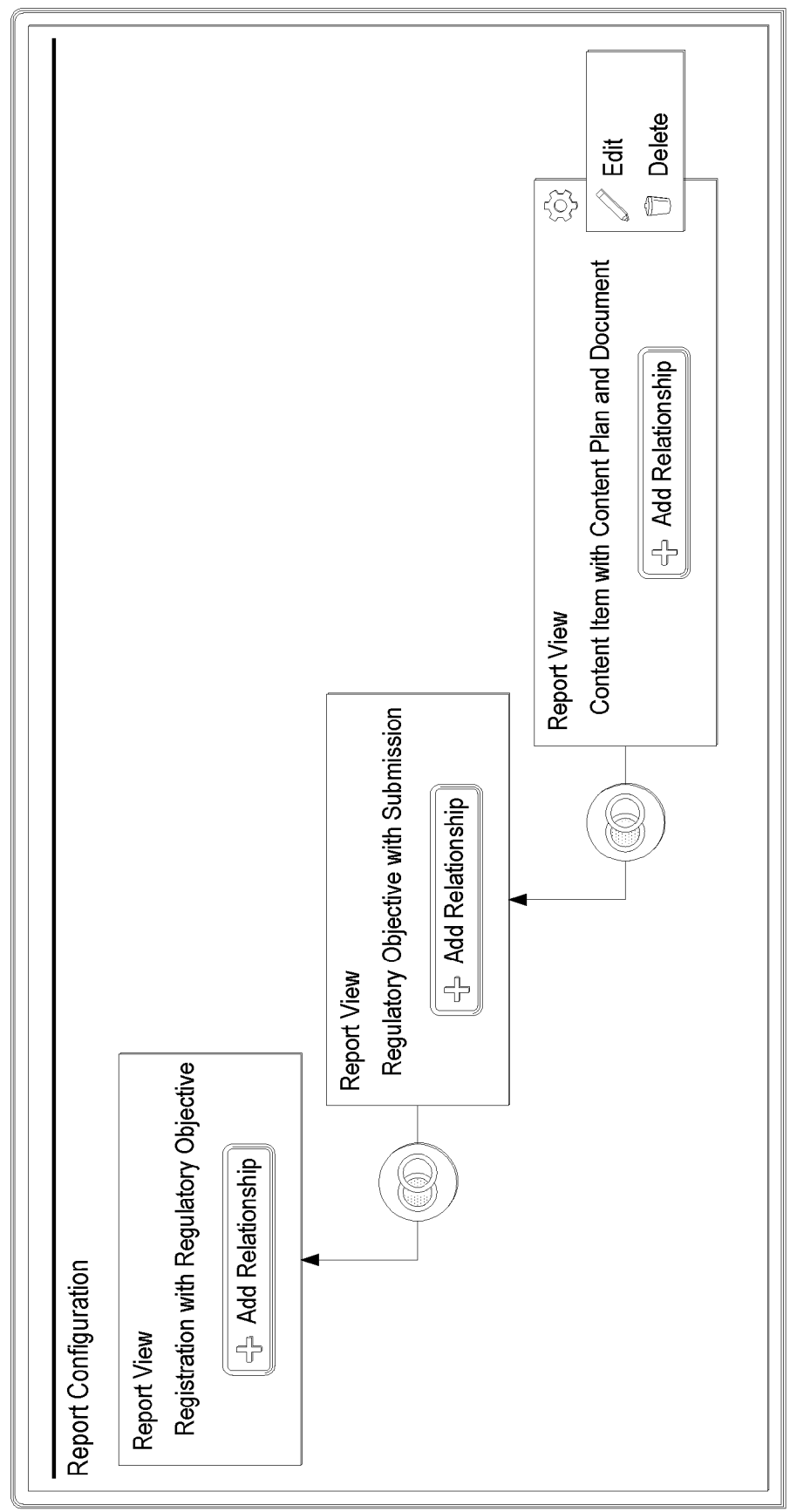

At 521, the Venn diagram for the final report type configuration may be generated and displayed. As shown in FIG. 16, the report view for the third entity, Content Item with Content Plan and Document is added as a left join to the report view of the second entity, Regulatory Objective with Submission.

As shown in FIG. 17, the multi-view report type may be differentiated from single view report type in the report type list.

Figure 5B:
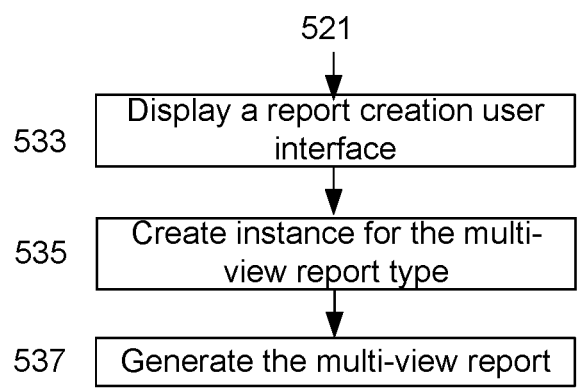

After the customer administrator configured the report type, a user may create a multi-view report. FIG. 5B illustrates an example flowchart of a method for creating a multi-view report in a content management system according to one embodiment of the present invention.

At 533, a report creation user interface 1800 may be displayed. A number of report types may be displayed on the user interface 1800. The user may select a report type, e.g., the Impacted Documents Report previously configured by the customer administrator of his organization. The user may then click on the Continue button 1801.

At 535, Instance may be created for the multi-view report type in response. As shown in FIG. 19, the three report views (Registration with Regulation Objective, Regulation Objective with Submission, Content Item with Content Plan and Document) previously configured in the report type are formatted according to the configuration, matched on the fields selected and joined in the format selected.

Figure 20:
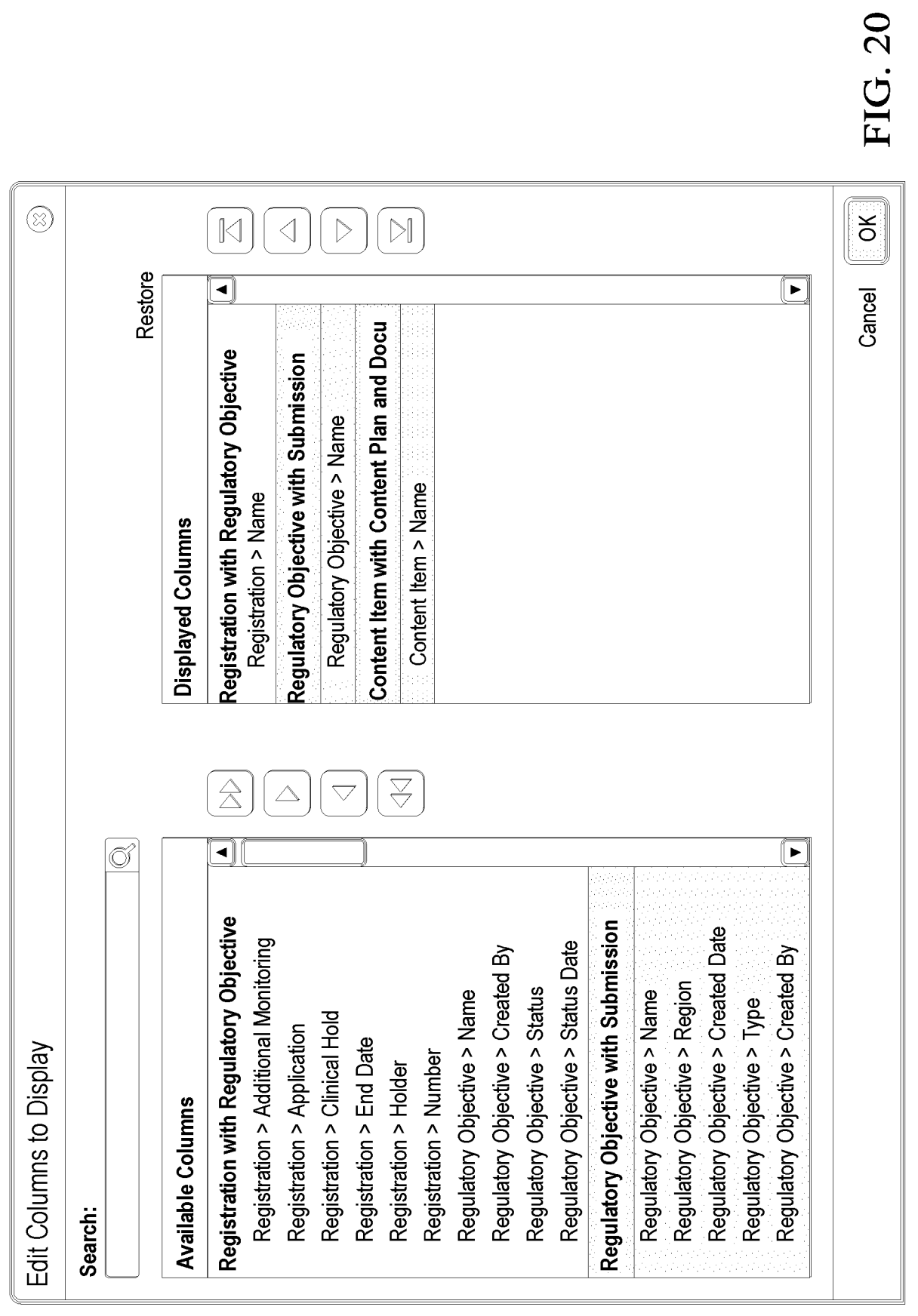

In one embodiment, fields selected in the report views may still be accessible on the multi-view report, as shown in FIG. 20.

Figure 21:
FIG. 21 illustrates an example multi-view report according to one embodiment of the present invention.

At 537, the multi-view report may be generated and displayed. One example of the multi-view report is shown in FIG. 21.

FIG. 22 illustrates another example of generating a multi-view report. As shown, two reports are combined into on multi-view report, based on a customer administrator's configuration: join the two report views on Month.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A method for generating a joined report in a content management system, the method comprising:
    displaying a first report view creation user interface for defining a first content management system report view, wherein the first report view creation user interface comprises a first report type, and wherein the first report type stores information about a first table for a first content management system report view, a second table for a second report view, and how they are joined together, wherein the first content management system report view comprises information about a first document stored in the content management system, and wherein the first content management system report view is built on the first document and is used to generate the joined report;
    displaying a user interface for adding a second report view to the joined report, wherein the user interface for adding the second report view comprises name of the second report view, a field to match the first content management system report view on, and a field to match the second report view on;
    in response to an input on the first report view creation user interface, displaying a first report view definition user interface for defining the first content management system report view, wherein the first report view definition user interface comprises a first area for receiving a user selection of a criterion of how to group rows of the first content management system report view;
    generating a preview of the first content management system report view in response to a request;
    saving the definition of the first content management system report view; and
    displaying a first report type configuration user interface, wherein the first report type configuration user interface comprises the first content management system report view and a description of the first report type.

2. The method of claim 1, wherein the user interface for adding the second report view further comprises a first join type for joining the first content management system report view and the second report view.

3. The method of claim 2, wherein the first join type comprises a left join, wherein all records from the first content management system report view are returned, and records in the second report view which are related to the first content management system report view are returned.

4. The method of claim 2, wherein the first join type comprises an inner join, wherein only records that have relationships across the first and second report views are returned.

5. The method of claim 2, wherein the first join type comprises an anti-join, wherein only records in the first content management system report view that do not have related records in the second report view are returned.

6. The method of claim 2, further comprising: generating a diagram for indicating the first join type.

7. The method of claim 2, further comprising: displaying a user interface for adding a third report view to the joined report, wherein the user interface for adding the third report view comprises name of the third report view, and a field to match the third report view on.

8. The method of claim 7, wherein the user interface for adding the third report view further comprises a second join type for joining the second report view and the third report view.

9. The method of claim 7, wherein the user interface for adding the third report view further comprises a third join type for joining the first content management system report view and the third report view.

10. The method of claim 2, further comprising: displaying a report creation user interface which comprises the first report type and a second report type.

11. The method of claim 10, further comprising: receiving an input for selecting the first report type.

12. The method of claim 11, further comprising: creating an instance for the first report type which comprises the first content management system report view and the second report view formatted according to the first report type configuration.

13. The method of claim 11, wherein the first content management system report view and the second report view are matched on the field according to the first report type configuration.

14. The method of claim 11, wherein the first content management system report view and the second report view are joined according to the first report type configuration.

15. The method of claim 11, further comprising: generating the joined report which comprises the first content management system report view and the second report view matched on the field according to the first content management system report type configuration.

16. A content management system comprising:
   a plurality of repositories for storing content; and
   a report generator for:
      displaying a first report view creation user interface for defining a first content management system report view, wherein the first report view creation user interface comprises a first content management system report type, wherein the first report type stores information about a first table for a first content management system report view, a second table for a second report view, and how they are joined together, wherein the first content management system report view comprises information about a first document stored in the content management system, and wherein the first content management system report view is built on the first document and is used to generate a joined report;

displaying a user interface for adding a second report view to the joined report, wherein the user interface for adding the second report view comprises name of the second report view, a field to match the first content management system report view on, and a field to match the second report view on;

in response to an input on the first report view creation user interface, displaying a first report view definition user interface for defining the first content management system report view, wherein the first report view definition user interface comprises a first area for receiving a user selection of a criterion of how to group rows of the first content management system report view;

generating a preview of the first content management system report view in response to a request;

saving the definition of the first content management system report view; and displaying a first report type configuration user interface, wherein the first report type configuration user interface comprises the first content management system report view and a description of the first report type.

17. The system of claim 16, wherein the user interface for adding the second report view further comprises a first join type for joining the first content management system report view and the second report view.

18. The system of claim 16, wherein the report generator further: generating a diagram for indicating the first join type.

* * * * *